Aug. 8, 1950    L. B. COURTOT    2,517,534
PRESSURE REGULATOR
Filed July 24, 1946
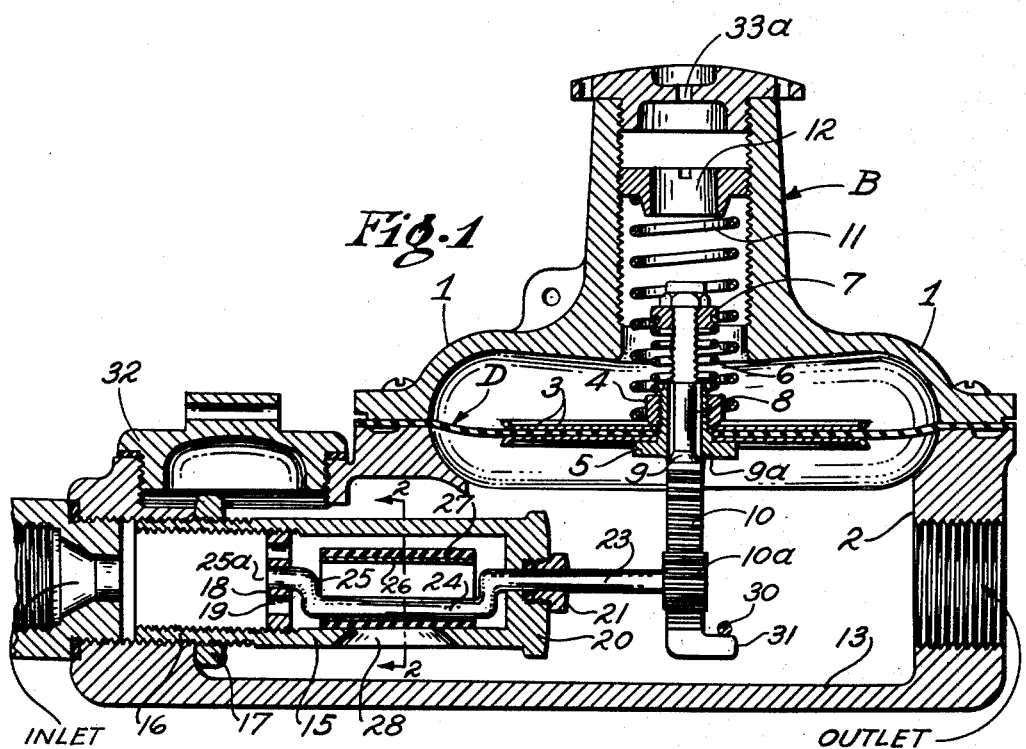
*Fig. 1*
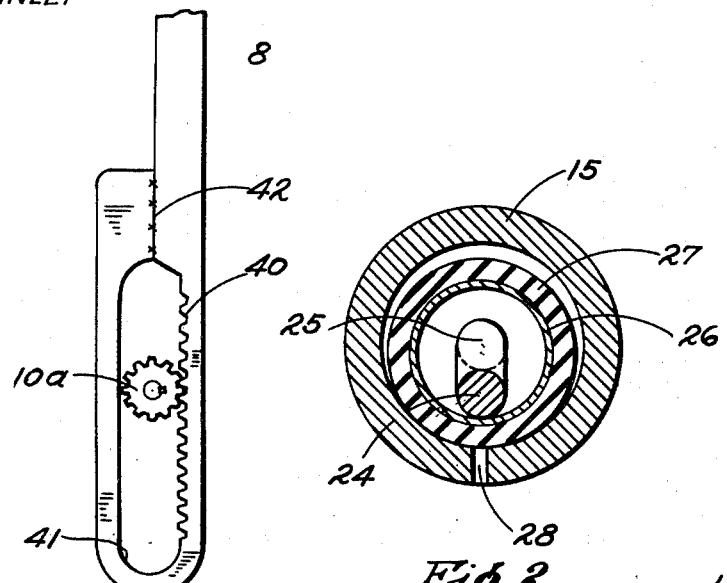
*Fig. 3*    *Fig. 2*
INVENTOR.
LOUIS B. COURTOT
BY
*Rickey & Watts*
ATTORNEYS Patented Aug. 8, 1950

2,517,534

UNITED STATES PATENT OFFICE 2,517,534

PRESSURE REGULATOR

Louis B. Courtot, Cleveland, Ohio, assignor to The Weatherhead Company, Cleveland, Ohio, a corporation of Ohio Application July 24, 1946, Serial No. 686,040

7 Claims. (Cl. 50—23)

This invention relates to pressure regulators and is directed to the novel regulating valve structure in association with the pressure regulator.

In the regulator of the type to which this invention relates the diaphragm is provided in the outlet or low pressure chamber and in response to pressure fluctuations in the outlet chamber the diaphragm moves and controls a valve which opens or closes a passageway connected to the inlet chamber. In regulators of the prior art the diaphragm has been relatively large because it must be able to exert enough force to move the regulator valve. It is an object of this invention to enable the use of a relatively small diaphragm under a given set of conditions by providing a regulating valve which operates smoothly under low torque.

Another object of this invention is to provide a pressure regulator in which the valve is dependable and which will maintain its adjustment over a long period of time without appreciable wear so that the output pressure of the regulator will remain constant in use. These and other objects will be apparent to those skilled in the art as the following detailed description of a preferred embodiment proceeds.

In the drawings:

Fig. 1 is a longitudinal section through the regulator;

Fig. 2 is a cross section of the valve assembly somewhat enlarged; and

Fig. 3 is a partial view showing a modified form of rack and pinion assembly.

The pressure regulator body B has an upper bell 1 and main body portion 2 which are fastened together by any convenient fasteners and which clamp the diaphragm D between them. The diaphragm D is also mounted between a pair of washers 3 which are clamped together by a nut 4 and sleeve member 5. A spring 6, acting against a washer 7, retained by a nut on a stem 8, urges a valve portion 9 on the stem against a valve seat 9a formed on the sleeve 5. As will be explained presently, normally due to spring 6, sleeve 5 and stem 8 act as a unitary member. A rack 10 is formed on the stem for cooperation with the pinion 10a which operates the valve as will be described later. A main regulating spring 11 reacts against adjustable nut 12 to urge the diaphragm in the direction tending to close the regulator valve in accordance with conventional practice.

The action of spring 11 on the diaphragm is opposed by the outlet pressure in chamber 13 so that the position of the diaphragm and hence of the regulating valve is controlled by outlet pressure, the limits being determined by adjustment of the nut 12.

The regulating valve R comprises a sleeve 15 which may be threaded into an inlet passageway as at 16 and clamped by a nut 17. At one end of the sleeve a wall member 18 is apertured as at 19 to permit the gas to enter the valve chamber. Another wall 20 is formed at the other end of the regulating sleeve. The wall 20 carries the packing nut 21 which, in conjunction with the packing associated therewith, seals the valve operating shaft 23. Shaft 23 has a cam portion 24 for operating the valve sleeve and an end bearing portion 25 is supported in the wall 18.

The valve itself may be formed of a cylinder of rubber or other plastic material 27 backed up by a metal sleeve 26, the diameter of the rubber sleeve 27 being smaller than the internal diameter of the sleeve 15. The sleeve 15 may be apertured or slotted as at 28 to provide a controlled passageway from the inlet chamber to the outlet chamber.

In operation, when the pressure in the outlet chamber 13 drops below a predetermined value, spring 11 causes the diaphragm to move down. The rack 10 drives the pinion 10a which turns shaft 23. This causes valve cam 24 to move in such a direction that the valve ring 27 is rolled within the sleeve to uncover a portion of the aperture 28. This admits fluid from the inlet chamber and increases the outlet pressure. When the outlet pressure has reached the predetermined value, the diaphragm will be moved upwardly by the outlet pressure which will reverse the action just described and tend to roll valve 27 over the aperture 28 to close it off. Due to the valve construction not only is the torque required to operate the valve small, but inlet pressure has no tendency to either open the valve or to close it. These features combine to permit the use of a small diaphragm to operate the valve. The only unbalanced pressure is that which is exerted against the end 25a of the valve shaft and this is in an axial direction and has no tendency to either open or close the valve. Likewise, the rolling action of the valve sleeve 27 inside the sleeve 15 reduces friction and wear and insures that the parts will maintain their adjustment over a long period of time.

In case the pressure in the outlet chamber 13 exceeds a certain predetermined value, the diaphragm will move up until a member 31 on the diaphragm stem strikes a fixed stop pin 30 attached to the housing. When this occurs any further increase in pressure will cause the sleeve 5 and seat 9a to lift clear of valve 9 venting the excess pressure to the atmosphere. The cap 33 may be provided with an opening 33a so that the upper side of the diaphragm is at atmospheric pressure. A cap member 32 may also be provided for ease in assembling the device.

Fig. 3 shows a modified rack construction which has certain advantages over that shown in Fig. 1. The stem 8 has an extension 40 upon which the rack teeth are formed and an extension 41 is provided. During manufacture extension 41 is bent around and the end thereof is welded as at 42 to the stem 8. This structure has two advantages, first a proper clearance between the extension 41 and the pinion 10a is provided which permits the parts to operate but prevents disengagement of the pinion from the rack. Second, the loop portion of the extension 41 serves the function of the stop and stop pin which were made as separate parts 30 and 31 respectively as seen in Fig. 1.

Having completed the description of my invention, I contemplate that various modifications may be made without departing from the spirit of the invention as defined in the claims. The design details such as the method of mounting regulating sleeve R, formation of the various caps 32 and 33, mounting of the diaphragm springs, etc., are merely illustrative of a preferred embodiment and may be varied in accordance with the usual practice in the art without invention. Although I have shown cam 24 as being formed by bending the shaft 23, the cam could be formed in any other convenient manner without departing from the spirit of the invention. The valve cylinder 27 may be made of rubber or any other suitable relatively flexible material which will effectively seal off the aperture 28. The backing cylinder 26 may be made of metal or any other material hard enough to prevent excessive deformation of the rubber cylinder valve 27.

These and other modifications may be made without departing from the spirit of the invention as defined in the appended claims.

Having thus described the present invention so that others skilled in the art may be able to understand and practice the same, I state that what I desire to secure by Letters Patent is defined in what is claimed.

What I claim is:

1. In a pressure regulator, a body having an outlet chamber, a regulator diaphragm forming one wall of said chamber, a hollow cylindrical member supported at one end by said body and extending into said outlet chamber to form an inlet chamber, said member including a wall portion having an inner cylindrical surface and an outer surface clear of said outlet chamber wall, a port through said wall portion, a valve member for said port having inner and outer cylindrical surfaces of smaller radius than that of the cylindrical surface of said wall portion, operator means for said valve member mounted for pivotal motion about the geometric center of said cylindrical wall portion, said operator means including cam means eccentric to said pivotal mounting, said cam means having a portion of maximum radius constructed and arranged for sliding engagement with the inner cylindrical surface of said valve member when the valve member is disposed with its outer cylindrical surface in engagement with said cylindrical surface of said wall portion, and means in said outlet chamber for translating motion of said diaphragm into rotation of said operator means.

2. In a pressure regulator, a body having an outlet chamber, a regulator diaphragm forming one wall of said chamber, a wall member supported by said body and extending into said outlet chamber to form an inlet chamber, said wall member including a portion having an inner cylindrical surface and an outer surface clear of said chamber wall, a port through said wall member portion, a valve member for said port having inner and outer cylindrical surfaces of smaller radius than that of the cylindrical surface of said wall portion, operator means for said valve member mounted for pivotal motion about the geometric center of said cylindrical wall portion, said operator means including cam means eccentric to said pivotal mounting, said cam means having a portion of maximum radius constructed and arranged for sliding engagement with the inner cylindrical surface of said valve member when the valve member is disposed with its outer cylindrical surface in engagement with said cylindrical surface of said wall member portion, and means in said outlet chamber for translating motion of said diaphragm into rotation of said operator means.

3. In a pressure regulator, a body having inlet and outlet chambers, wall means separating said chambers including a wall portion having an inner cylindrical surface, a port through said wall portion, a valve member for said port having inner and outer cylindrical surfaces of smaller radius than that of the cylindrical surface of said wall portion, operator means for said valve member mounted for pivotal motion about the geometric center of said cylindrical body wall portion, said operator means including cam means eccentric to said pivotal mounting, said cam means having a portion of maximum radius from said pivotal mounting constructed and arranged for sliding engagement with the inner cylindrical surface of said valve member when the valve member is disposed with its outer cylindrical surface in engagement with said cylindrical surface of said body wall portion, whereby said valve member is rolled across said port upon rotation of said operator means, a diaphragm in said body having one face exposed to pressure in said outlet chamber, and means for translating motion of said diaphragm into rotation of said operator means.

4. In a pressure regulator, a body having inlet and outlet chambers, wall means separating said chambers including a wall portion having an inner cylindrical surface, a port through said wall portion in the form of a narrow axial slot, a valve member for said port having inner and outer cylindrical surfaces of smaller radius than that of the cylindrical surface of said wall portion, operator means for said valve member mounted for pivotal motion about the geometric center of said cylindrical body wall portion, said operator means including cam means eccentric to said pivotal mounting, said cam means having a portion of maximum radius from said pivotal mounting constructed and arranged for sliding engagement with the inner cylindrical surface of said valve member when the valve member is disposed with its outer cylindrical surface in engagement with said cylindrical surface of said body wall portion, whereby said valve member is rolled across said port upon rotation of said operator means, a diaphragm in said body having one face exposed to pressure in said outlet chamber, and means for translating motion of said diaphragm into rotation of said operator means.

5. In a pressure regulator, a body having inlet and outlet chambers, wall means separating said chambers including a wall portion having an inner cylindrical surface, a port through said wall portion, a valve member for said port comprising a rubber-like sealing member and a relatively non-deformable backing member therefor, said valve members respectively having outer and inner cylindrical surfaces of smaller radius than that of the cylindrical surface of said body wall portion, operator means for said valve member mounted for pivotal motion about the geometric center of said cylindrical wall portion, said operator means including cam means eccentric to said pivotal mounting, said cam means having a portion of maximum radius from said pivotal mounting constructed and arranged for sliding engagement with the inner cylindrical surface of said valve backing member when the valve member is disposed with its outer cylindrical surface in engagement with said cylindrical surface of said wall portion, whereby said rubber-like valve member is rolled across said port upon rotation of said operator means, a diaphragm in said body having one face exposed to pressure in said outlet chamber, and means for translating motion of said diaphragm into rotation of said operator means.

6. In a pressure regulator, a body having inlet and outlet chambers, wall means separating said chambers including a wall portion having an inner cylindrical surface, a port through said wall portion, a valve member for said port having inner and outer cylindrical surfaces of smaller radius than that of the cylindrical surface of said wall portion, operator means for said valve member mounted for pivotal motion about the geometric center of said cylindrical wall portion, said operator means including cam means eccentric to said pivotal mounting, said cam means having a portion of maximum radius from said pivotal mounting constructed and arranged for sliding engagement with a narrow zone of the inner cylindrical surface of said valve member when the valve member is disposed with its outer cylindrical surface in engagement with said cylindrical surface of said wall portion, whereby said valve member is rolled across said port upon rotation of said operator means, a diaphragm in said body having one face exposed to pressure in said outlet chamber, and means for translating motion of said diaphragm into rotation of said operator means.

7. In a pressure regulator, a body having inlet and outlet chambers, wall means separating said chambers including a wall portion having an inner cylindrical surface, a port through said wall portion, a valve member for said port having inner and outer cylindrical surfaces of smaller radius than that of the cylindrical surface of said wall portion, operator means for said valve member mounted for pivotal motion about the geometric center of said cylindrical wall portion, said operator means including cam means eccentric to said pivotal mounting, said cam means having a portion of maximum radius from said pivotal mounting constructed and arranged for sliding engagement with the inner cylindrical surface of said valve member when the valve member is disposed with its outer cylindrical surface in engagement with said cylindrical surface of said wall portion, whereby said valve member is rolled across said port upon rotation of said operator means, a diaphragm in said body having one face exposed to pressure in said outlet chamber, means for translating motion of said diaphragm into rotation of said operator means, said maximum radius cam portion being in line with said port and said pivotal mounting when the parts are positioned to close the port.

LOUIS B. COURTOT.

REFERENCES CITED

The following references are of record in the file of this patent:

UNITED STATES PATENTS

| Number | Name | Date |
| --- | --- | --- |
| 1,452,252 | Muller | Apr. 17, 1923 |
| 2,055,347 | Hackman | Sept. 22, 1936 |
| 2,165,874 | Sauls | July 11, 1939 |